United States Patent
Goodman

(10) Patent No.: US 7,222,173 B2
(45) Date of Patent: May 22, 2007

(54) LIMITED KNOWLEDGE OF CONFIGURATION INFORMATION OF A FICON CONTROLLER

(75) Inventor: David P. Goodman, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 10/361,387

(22) Filed: Feb. 10, 2003

(65) Prior Publication Data
US 2004/0249929 A1 Dec. 9, 2004

(51) Int. Cl.
G06F 15/173 (2006.01)

(52) U.S. Cl. .................. 709/224; 709/201; 709/220; 709/223; 711/114

(58) Field of Classification Search ............... 370/360; 709/201; 711/114; 715/505
See application file for complete search history.

(56) References Cited

U.S. PATENT DOCUMENTS

| | | | | |
|---|---|---|---|---|
| 5,931,947 | A | 8/1999 | Burns et al. ................. | 713/201 |
| 6,327,621 | B1 | 12/2001 | Lee et al. ................... | 709/227 |
| 6,898,202 | B2 * | 5/2005 | Gallagher et al. .......... | 370/401 |
| 7,058,761 | B2 * | 6/2006 | Nakamura et al. .......... | 711/114 |
| 2001/0008010 | A1* | 7/2001 | Sanada et al. .............. | 711/152 |
| 2002/0010790 | A1 | 1/2002 | Ellis et al. .................. | 709/238 |
| 2002/0013832 | A1 | 1/2002 | Hubbard ..................... | 709/220 |
| 2002/0016855 | A1 | 2/2002 | Garrett et al. .............. | 709/238 |
| 2002/0022483 | A1 | 2/2002 | Thompson et al. .......... | 455/439 |
| 2002/0023171 | A1 | 2/2002 | Garrett et al. .............. | 709/238 |
| 2003/0145114 | A1* | 7/2003 | Gertner ....................... | 709/246 |
| 2004/0039989 | A1* | 2/2004 | Warren ........................ | 715/505 |
| 2006/0123157 | A1* | 6/2006 | Kalos et al. .................. | 710/36 |

FOREIGN PATENT DOCUMENTS

| EP | 0773489 A1 | 5/1997 |
|---|---|---|
| WO | 0000889 A2 | 1/2001 |
| WO | 0180014 A2 | 10/2001 |

OTHER PUBLICATIONS

Temple, J. III et al. "Heterogeneous Client Server Method, System and Program Product for a Partitioned Processing Environment", IBM Patent Application, IBM Docket No. POU920000115US1, U.S. Appl. No. 09/583,501, filed May 3, 2000.

McCord, J. "Apparatus and Method for Reduction of Side Reading Effects in Lead-Overlay and Exchange-Tab Structures", IBM Patent Application, IBM Docket No. SJO920010156US1, U.S. Appl. No. 10/255,867, filed Sep. 26, 2002.

Yashiro, M. et al. Fujitsu's Storage Area Network (SAN) Technologies, Fujitsu, vol. 52, No. 2 pp. 113-117. 2001.

* cited by examiner

Primary Examiner—Yves Dalencourt
(74) Attorney, Agent, or Firm—David R. Irvin; Karuna Ojnen

(57) ABSTRACT

Method and apparatus for limiting access to control units channel-connected to host computers through a FICON switch. The control unit port of the FICON switch receives a requests from an attached host to provide configuration information regarding the switch ports. The control unit port deliberately misrepresents the port configuration of the switch by reporting that ports outside the zone of the requesting host are not installed, even though these ports may in fact be installed for use by other hosts that belong to other zones.

4 Claims, 4 Drawing Sheets

FIG. 3

| Visibility Table | | | | | | | |
|---|---|---|---|---|---|---|---|
| | Port Numbers | | | | | | |
| ID | 1 | 2 | 3 | 4 | 5 | 6 | |
| WWN1 | ✓ | N | ✓ | N | ✓ | N | |
| WWN2 | N | ✓ | N | ✓ | ✓ | ✓ | |

240
241
242

LIMITED KNOWLEDGE OF CONFIGURATION INFORMATION OF A FICON CONTROLLER

FIELD OF THE INVENTION

The present invention relates to the field of computer channel connections, and more particularly to the field of limiting unauthorized access by hosts to control units through a FICON switch.

BACKGROUND

IBM Fiber Connection, known more commonly as FICON, provides high-speed links used for attaching S/390 control units to S/390 systems, allowing interconnection of input/output (I/O) devices and host systems that are separated by tens of kilometers. For example, FICON may be used with the IBM Enterprise Storage Server. FICON is based on the industry-standard Fibre Channel architecture; consequently, the two have much in common. FICON is described in detail by C. M. DeCusatis, et al., in "Fiber optic interconnects for the IBM S/390 Parallel Enterprise Server G5," *IBM Journal of Research and Development*, Vol. 43, No. 5/6 (September/November 1999), pp. 807–828. IBM, FICON, IBM Enterprise Storage Server, and S/390 are trademarks of the International Business Machines Corporation, Armonk, N.Y.

FICON supports several topologies, including point-to-point and switched. In a switched topology, one link is connected from a FICON channel to a port on a switch, and another link is connected from a port on a FICON control unit to port on the same switch. Typically, switched topology is used to connect two or more hosts to two or more control units such as I/O devices.

Fibre Channel switches used for FICON traffic are sometimes called "directors." One example of such a switch is the ED-5000 Enterprise Director by McDATA Corporation of Broomfield, Colo.

Control of a FICON switch is based on port connectivity definitions, which partition switch ports into port groups, where ports within a given port group are intended to communicate only with other ports in that same port group. Fibre Channel itself supports two kinds of zoning: hard zoning, which is enforced by the switch hardware, and soft zoning, which relies on the good intentions of the connected devices. In contrast to Fiber Channel, FICON supports only port connectivity definitions.

Traditionally, this shortcoming has not been important, because all of the ports have traditionally belonged to the same user. This is now changing with the increasing importance of applications such as Storage Area Networking, wherein a service provider offers data storage to a number of unrelated customers who share the service provider's common hardware, and in particular share a common FICON switch. In such cases, it is important that one customer not be able to gain access to data belonging to another customer. Thus there is a need to improve the separation of customers who share a common FICON switch.

SUMMARY

The present invention provides a way of limiting unauthorized access to control units connected to host computers through a FICON switch. According to the invention, the control unit port (CUP) of the FICON switch receives a request from an attached host to provide information regarding the switch ports that the host may connect to. In one embodiment of the invention, the CUP reads visibility information and configuration information from its memory, alters the configuration information according to the visibility information, and returns the altered configuration information to the requesting host. In another embodiment, the CUP reads preestablished altered configuration information, i.e., visibility masks, from its memory. In both embodiments, the altered configuration information is based on the port configuration of the switch. In the altered configuration information, however, ports outside the zone of the host are deliberately misrepresented as "not installed," even though these ports may in fact be installed for use by other hosts that belong to other zones.

BRIEF DESCRIPTION OF THE DRAWINGS

FIG. 3 shows an exemplary structure of a visibility table used by the FICON switch of the present invention.

DETAILED DESCRIPTION

The present invention provides a way of limiting unauthorized access to control units that are channel-connected to host computers through a FICON switch. Although the invention is not so limited, it is especially useful when applied to Storage Area Networking wherein a vendor provides managed storage services to a plurality of customers who require privacy.

Figure 1:
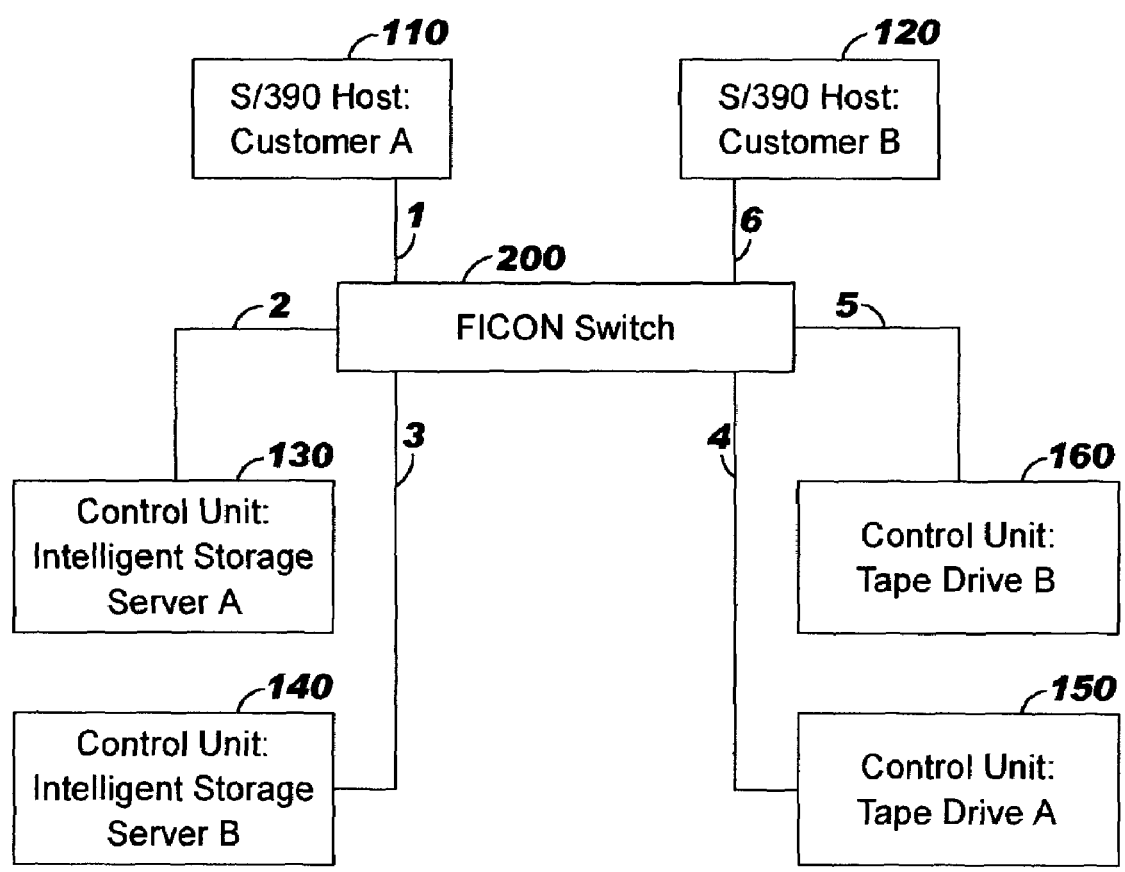
FIG. 1 shows an exemplary configuration wherein the present invention may be usefully applied.

FIG. 1 shows an exemplary configuration of this sort wherein the present invention may be usefully applied. In FIG. 1, a first host, Customer A 110, and a second host, Customer B 120, are channel-connected to ports 1 and 6, respectively, of a FICON switch 200. Also connected to the FICON switch 200 are a first control unit, Intelligent Storage Server A 130, a second control unit, Intelligent Storage Server B 140, a third control unit, Tape Drive A 150, and a fourth control unit, Tape Drive B 160, via ports 2–5, respectively, of the FICON switch 200. Such a configuration may be used, for example, to enable a service provider who owns the four control units 130–160 to offer Storage Area Network services to customer A 110 and customer B 120 through the channels of S/390 hosts used by the customers.

The exemplary configuration of FIG. 1 potentially enables connection, at least at the physical layer level, of either S/390 channel (i.e., the channels of the S/390 hosts used by Customer A 110 and Customer B 120) to any of the four control units 130–160. When S/390 channels are connected to control units using a conventional soft-zoning FICON switch, i.e., a FICON switch that does not incorporate the present invention, each customer's host S/390 gains an understanding of the configuration and available control units by sending a request through its channel to the FICON switch 200 for configuration information regarding connections to the ports of the FICON switch 200. The FICON switch 200 returns this information to the requesting S/390.

Unfortunately, the honor system implicit in a conventional FICON switch may be violated, as the FICON switch 200 has no way to detect attempts to connect out-of-zone by rogues. Thus there is no way to ensure with an acceptable degree of confidence that Customer B 120 cannot see data belonging to Customer A 110, and vice versa. The present invention overcomes this shortcoming of the conventional FICON switch.

Figure 2:
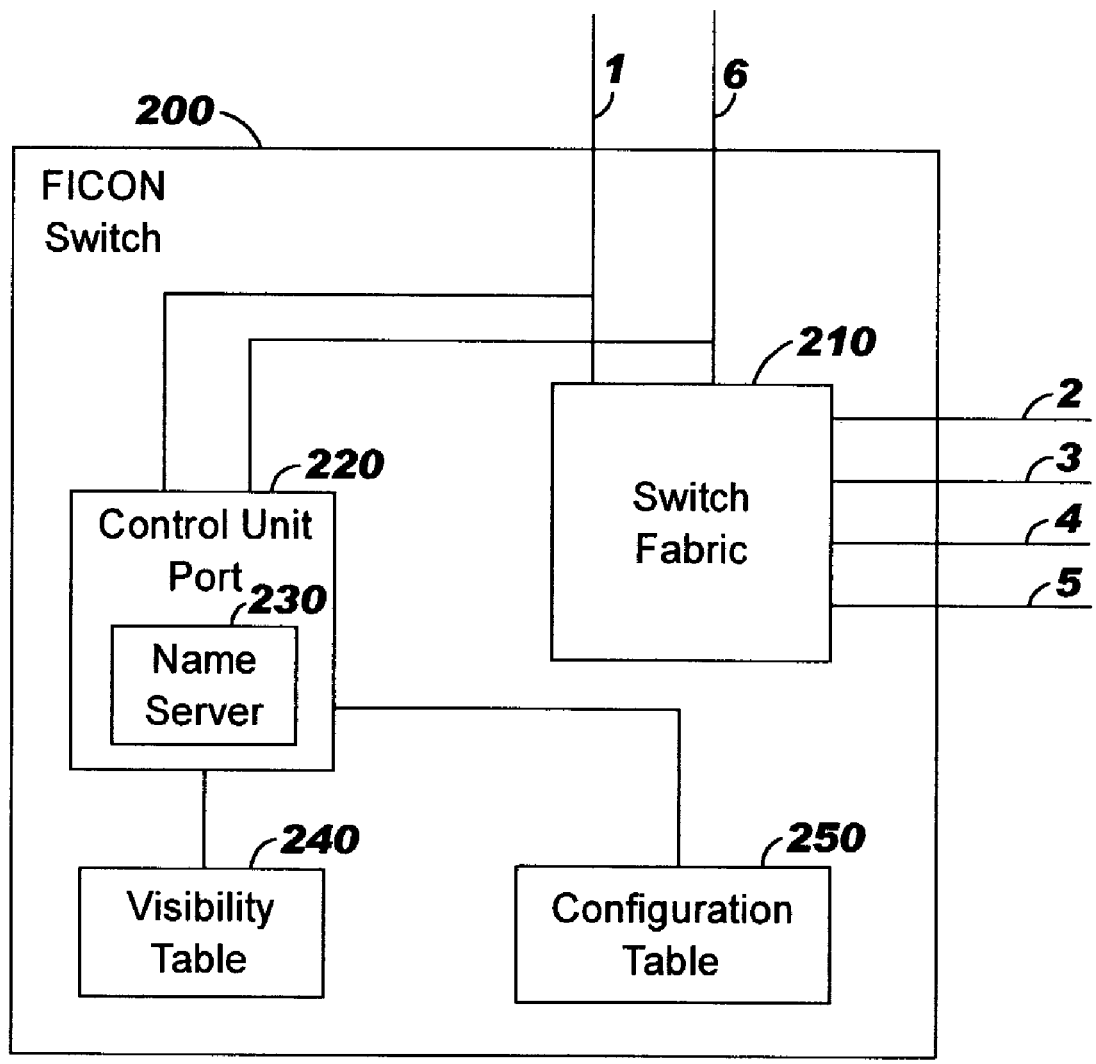
FIG. 2 shows an exemplary configuration of a FICON switch according to the present invention.

As shown in FIG. 2, the FICON switch 200 includes a switch fabric 210, which provides physical or logical connectivity among devices connected to the ports of the FICON switch 200. The switch fabric 210 need not be literally a crosspoint, and may be instead any means for providing connectivity among the ports. The term "switch fabric" as used here is intended to cover fabrics provided by cascading as well as single-fabric switches of the kind shown for descriptive simplicity in FIG. 2.

The FICON switch 200 includes a control unit port (CUP) 220, by which the attached channels, for example the channels of S/390 hosts used by Customer A 110 and Customer B 120, communicate in-band with the FICON switch 200. The control unit port 220 provides topology or configuration information, port statistics, error reports, and so forth, and generally serves as a point of control for the FICON switch 200. A name server 230 maintains zoning information. More specifically, according to one embodiment of the present invention the name server 230 maintains a visibility table 240, which is described in more detail below, and a conventional FICON configuration table 250, which contains control-unit-dependent configuration information used to establish connections to control units through the FICON switch. Although FIG. 2 shows the visibility table 240, the configuration table 250, and the name server 230 as separate entities for descriptive convenience, the three, or any two of the three may, of course, be combined, or may share common memory for storing data. The control unit port 220 may include the name server 230 as shown in FIG. 2, or the two may be separate.

FIG. 3 shows an exemplary structure of the visibility table 240. In keeping with the running example introduced with reference to FIG. 1, the exemplary visibility table 240 has two rows, which are a first row 241 and a second row 242. Each row includes an ID that identifies a S/390 host that uses the FICON switch 200. A row shows the ports that the host is allowed to connect to. Permission to connect is indicated by a check mark in FIG. 3, whereas the absence of permission to connect is indicated by "N." Information regarding permission may be entered by an administrator or control operator through the control unit port 220.

For example, the first row 241 of the visibility table 240 indicates that the first channel, i.e., the channel used by Customer A 110, which has ID WWN1, is allowed to connect to ports 1, 3 and 5 of the FICON switch 200. The connection to port 1 is self knowledge, as that is the port by which the first channel itself connects to the FICON switch 200. In this example, port 3 enables connection to the second control unit, which is intelligent storage server B 140, and port 5 enables connection to the fourth control unit, which is tape drive B 160. Likewise, the second row 242 of the visibility table 240 indicates that the second channel, i.e., the channel used by Customer B 120, which has ID WWN2, is allowed to connect to ports 2, 4, 5, and 6 of the FICON switch 200. Again, the connection to port 6 is self knowledge, as that is the port by which the second channel itself connects to the FICON switch 200. Port 2 enables connection to the first control unit, which is intelligent storage server A 130, port 4 enables connection to the third control unit, which is Tape Drive A 150, and port 5 enables connection to the fourth control unit, which is tape drive B 160.

Thus the running example illustrates two FICON zones. The first zone comprises the S/390 host used by Customer A 110, the second control unit, which is intelligent storage server B 140, and the fourth control unit, which is tape drive B 160. The second zone comprises the S/390 host used by Customer B 120, the first control unit, which is intelligent storage server A 130, the third control unit, which is Tape Drive A 150, and the fourth control unit, which is tape drive B 160. In this example, the first zone and the second zone differ, as the first zone and the second zone do not have exactly the same elements, i.e., they differ by at least one element.

Figure 4:
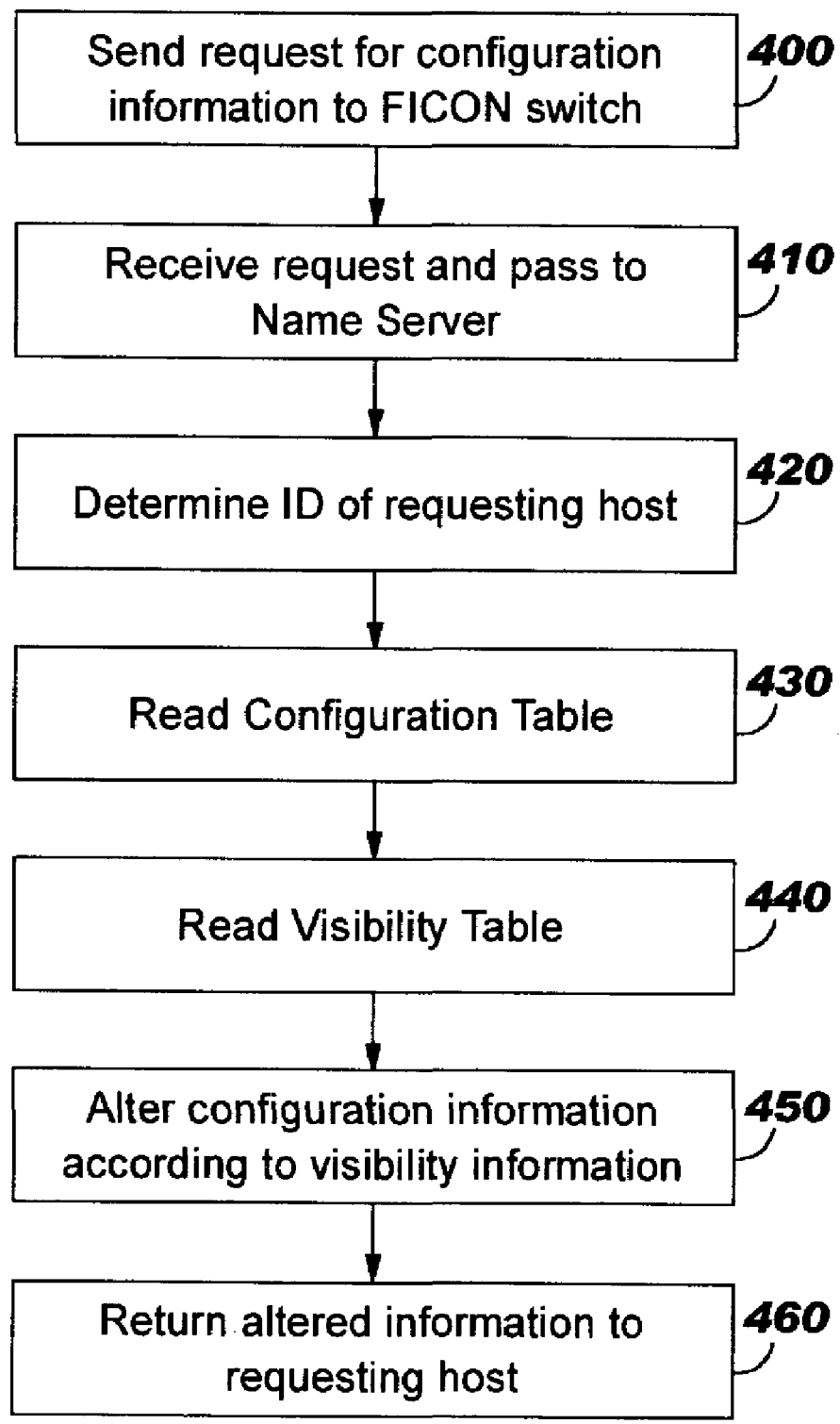
FIG. 4 shows aspects of a method of operating a FICON switch according to the present invention.

FIG. 4 shows aspects of a method of operating the FICON switch 200 according to the present invention. In order to gain configuration knowledge, and thereby knowledge of the control unit resources that are available for use, a host S/390 sends an in-band request for configuration information through its channel to the control unit port 220 of the FICON switch 200 (step 400).

The control unit port 220 receives the request from the host for information regarding switch ports that the host is allowed to use, and passes the request to the name server 230 (step 410). The name server 230 determines the ID of the channel conveying the request (step 420), for example by reading the ID from the request, or by reading another field of the request and mapping the content of that field to the ID of the requesting channel. Based on this ID, the name server 230 determines the zone that includes the requesting host. For at least one switch port that is not in the zone that includes the requesting host, the name server 230 sends, to the requesting host, an indication that the switch port is not installed, even though the switch port is in fact installed for use by another host that is included in another zone that differs from the zone of the requesting host.

To do this, according to one embodiment of the invention, the name server 230 reads the configuration table 250 to determine control-unit-dependent configuration information to be reported back over the identified channel (step 430). Rather than send this information directly to the requesting channel, however, the name server 230 reads the visibility table 240, selecting the row of the visibility table 240 that is associated with the ID of the requesting channel (step 440). The name server 230 then alters the information read from the configuration table 250 according to the information read from the visibility table 240 (step 450), and sends the altered information to the requesting host (step 460).

As a descriptive convenience for one embodiment of the invention, the visibility table 240 and the configuration table 250 are described here as separate structures, where data read from the latter is modified according to data read from the former in order to derive individual privileges from general configuration information. This separation is not, however, a necessary condition of the invention. In another embodiment, altered configuration information may be pre-established by an administrator or control operator and stored in a single table, wherein the individual privileges of each host ID are delineated and called here a "visibility mask."

According to both embodiments of the invention, the configuration information regarding control units is altered to deliberately misrepresent port connections of control units that the requesting host does not have permission to use. This is done by indicating that these ports are not installed, despite the fact that a port reported as "not installed" may indeed be installed for use by some other host that has the appropriate permission. In the running example, a reply to a request by the first host (ID WWN1) would show that ports 2 and 4 of the FICON switch 200 are not installed and have no attached control units, even though these ports are indeed installed and used to connect the second host (ID WWN2) to the first control unit (Intelligent Storage Server A 130) and to the third control unit (tape drive A 150), respectively. Likewise, a reply to a request by the second host (ID WWN2) would show that port 3 of the FICON switch 200 is not installed and has no attached control unit, even though this port is indeed installed and used to connect the first host (ID WWN1) to the second control unit (Intelligent Storage Server B 140).

From the foregoing description, those skilled in the art will now appreciate that the present invention provides a way of increasing the separation of data belonging to Customer A 110 and Customer B 120 by deliberately misrepresenting the configuration of the ports of the FICON switch 200. The foregoing description is illustrative rather than limiting, however, and the present invention is limited only by the claims that follow.

I claim:

1. A method for limiting access to control units channel-connected to hosts through a FICON switch, comprising the steps of:

receiving a request from a first host for configuration information regarding switch ports of the FICON switch;

determining a first zone that includes the first host; and for at least one switch port not in the first zone, sending to the first host an indication that the switch port is not installed, wherein the switch port is installed for use by a second host that is included in a second zone that differs from the first zone, wherein the indication includes a visibility mask; and wherein the method further comprising the steps of reading configuration information from a configuration table; reading visibility information from a visibility table; altering the read configuration information according to the read visibility information, to provide altered configuration information; and sending the altered configuration information to the first host.

2. A program storage device readable by a machine, storing a program of instructions executable by the machine to perform method steps for limiting access to control units channel-connected to hosts through a FICON switch, said method steps comprising:

receiving a request from a first host for configuration information regarding switch ports of the FICON switch;

determining a first zone that includes the first host; and for at least one switch port not in the first zone, wherein the indication includes a visibility mask; reading configuration information from a configuration table; and wherein the method further the steps of reading visibility information from a visibility table; altering the read configuration information according to the read visibility information, to provide altered configuration information; and sending the altered configuration information to the first host, sending to the first host an indication that the switch port is not installed, wherein the switch port is installed for use by a second host that is included in a second zone that differs from the first zone.

3. A FICON switch for limiting unauthorized access to control units, comprising:

a switch fabric; and logic for receiving a request from a first host for configuration information regarding ports of the switch fabric; determining a first zone that includes the first host; and, for at least one switch port not in the first zone, sending to the first host an indication that the switch port is not installed, wherein the switch port is installed for use by a second host that is included in a second zone that differs from the first zone, wherein the indication includes a visibility mask; and wherein the fabric switch further comprising logic for reading configuration information from a configuration table; logic for reading visibility information from a visibility table; logic for altering the read configuration information according to the read visibility information, to provide altered configuration information; and logic for sending the altered configuration information to the first host.

4. The FICON switch of claim 3, wherein the logic is included in a name server of a FICON control unit port.

* * * * *